(12) United States Patent
Jacob et al.

(10) Patent No.: US 10,677,939 B2
(45) Date of Patent: Jun. 9, 2020

(54) SYSTEM AND METHOD OF ACQUIRING IMAGES USING AN X-RAY IMAGING SYSTEM

(71) Applicant: GENERAL ELECTRIC COMPANY, Schenectady, NY (US)

(72) Inventors: Biju Jacob, Schenectady, NY (US); Hao Lai, Niskayuna, NY (US); Remy Andre Klausz, Buc (FR); John Eric Tkaczyk, Delanson, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 557 days.

(21) Appl. No.: 14/927,244

(22) Filed: Oct. 29, 2015

(65) Prior Publication Data
US 2017/0123079 A1    May 4, 2017

(51) Int. Cl.
| | |
|---|---|
| *G01T 1/20* | (2006.01) |
| *H04N 5/32* | (2006.01) |
| *H04N 5/361* | (2011.01) |
| *H04N 5/365* | (2011.01) |
| *H04N 5/355* | (2011.01) |
| *G01T 1/24* | (2006.01) |

(52) U.S. Cl.
CPC .............. *G01T 1/2018* (2013.01); *G01T 1/24* (2013.01); *H04N 5/32* (2013.01); *H04N 5/3205* (2013.01); *H04N 5/35554* (2013.01); *H04N 5/361* (2013.01); *H04N 5/3651* (2013.01)

(58) Field of Classification Search
CPC ................................. G01T 1/2018; G01T 1/24
See application file for complete search history.

(56) References Cited

U.S. PATENT DOCUMENTS

| | | |
|---|---|---|
| 5,343,297 A | 8/1994 | Tiemann et al. |
| 6,311,895 B1 | 11/2001 | Olmstead et al. |
| 7,566,876 B2 | 7/2009 | Moody et al. |

(Continued)

FOREIGN PATENT DOCUMENTS

| | | |
|---|---|---|
| EP | 0038697 A1 | 10/1981 |
| EP | 1426009 A1 | 6/2004 |

(Continued)

OTHER PUBLICATIONS

Farrier, Michael, et al.; "Very Large Area CMOS Active-Pixel Sensor for Digital Radiography", IEEE Transactions on Electron Devices, vol. 56, Issue 11, pp. 2623-2631, Nov. 2009.

(Continued)

*Primary Examiner* — David P Porta
*Assistant Examiner* — Shun Lee
(74) *Attorney, Agent, or Firm* — Fletcher Yoder, P.C.

(57) ABSTRACT

Improvement of the dynamic range of a radiation detector is described. In one embodiment, one or more non-destructive readout operations are performed during a radiation exposure event to acquire data used to improve the dynamic range of the detector. In one implementation, one or more non-destructive readouts of pixels are performed prior to saturation of the pixels during an X-ray exposure so as to obtain non-saturated measurements at the pixels. In an additional implementation, non-destructive readouts of pixels are performed between exposure events so as to obtain an estimate of electronic noise during a multi-exposure examination.

11 Claims, 8 Drawing Sheets

(56) References Cited

U.S. PATENT DOCUMENTS

| | | |
|---|---|---|
| 7,839,450 B2 | 11/2010 | Hing et al. |
| 8,680,473 B2 | 3/2014 | Durst et al. |
| 2003/0086523 A1 | 5/2003 | Tashiro et al. |
| 2003/0095189 A1* | 5/2003 | Liu .................... H04N 5/23248 348/208.4 |
| 2004/0017891 A1 | 1/2004 | Endo |
| 2004/0234032 A1 | 11/2004 | Nokita |
| 2007/0071171 A1* | 3/2007 | Hayashida ............... A61B 6/00 378/98 |
| 2009/0251580 A1* | 10/2009 | Schemmann .......... H04N 5/343 348/308 |
| 2013/0202086 A1* | 8/2013 | Tsuji ........................ G01T 1/026 378/62 |
| 2013/0322596 A1* | 12/2013 | Inoue ........................ G01T 1/17 378/62 |
| 2013/0327950 A1 | 12/2013 | Niwa et al. |

FOREIGN PATENT DOCUMENTS

| | | |
|---|---|---|
| JP | 5065641 B2 | 11/2012 |
| JP | 2014096639 A | 5/2014 |
| WO | 2007135175 A2 | 11/2007 |

OTHER PUBLICATIONS

PCT Invitation to Pay Additional Fees issued in connection with Corresponding PCT Application No. PCT/US2016/053662 dated Dec. 2, 2016.

International Invitation to Pay Additional Fees issued in connection with corresponding PCT Application No. PCT/US2016/053662 dated Dec. 2, 2016.

International Search Report and Written Opinion issued in connection with corresponding PCT Application No. PCT/US2016/053662 dated Feb. 22, 2017.

* cited by examiner

SYSTEM AND METHOD OF ACQUIRING IMAGES USING AN X-RAY IMAGING SYSTEM

BACKGROUND

The subject matter disclosed herein relates to X-ray imaging and, in particular, to the improvement of the effective dynamic range achieved by a detector used in an imaging process.

Non-invasive imaging technologies allow images of the internal structures or features of a patient or object to be obtained without performing an invasive procedure on the patient or object. In particular, such non-invasive imaging technologies rely on various physical principles, such as the differential transmission of X-rays through the target volume or the reflection of acoustic waves, to acquire data and to construct images or otherwise represent the observed internal features of the patient or object.

For example, in computed tomography (CT) and other X-ray based imaging technologies, X-ray radiation is directed toward a subject, typically a patient in a medical diagnostic application, a package or baggage in a security screening application, or a fabricated component in an industrial quality control or inspection application. A portion of the radiation impacts a detector where the image data is collected. In digital X-ray systems, a detector generates digital signals representative of the amount or intensity of radiation impacting discrete pixel regions of the detector surface. The signals may then be processed to generate an image that may be displayed for review. In the images produced by such systems, it may be possible to identify and examine the internal structures and organs within a patient's body, objects within a package or container, or defects (e.g., cracks) within a fabricated component. In volumetric imaging systems (such as computed tomography (CT), tomosynthesis, or C-arm angiography systems) a detector array, including a series of detector elements, produces similar signals through various positions as one or both of the source and detector are displaced around the imaged volume, allowing data to be acquired over a limited or complete angular range.

X-ray detection at the detector often utilizes a scintillator, which converts higher-energy X-ray radiation to lower-energy light photons that are sensed using photo-sensitive components (e.g., photodiodes or other suitable photodetectors). The detector is typically divided into a matrix of discrete picture elements or pixels, and encodes output signals based upon the quantity or intensity of the radiation impacting each pixel region. The signals may then be processed to generate an image that may be displayed for review.

In certain instances, during an X-ray exposure where an object is being imaged but relatively little attenuation is present (e.g., due to the size, positioning, or structure of the imaged object, such as at a skin line or tissue boundary) there is a possibility that portions of the detector array in this region of insufficient attenuation will be saturated, while other areas where more attenuation is present are not. That is, the accumulated charge at a given pixel or set of pixels may reach a limit, such that additional exposure does not result in a corresponding increase in measured charge at the pixel. Saturation leads to the loss of information and is characteristic of a detector having insufficient dynamic range to accommodate the X-ray exposure levels, in this instance a failure to accommodate the highest levels of radiation observed at imaged regions of interest, such as near the tissue edge or skin line.

Conversely, under certain short exposure conditions (e.g., in a tomosynthesis frame in three-dimensional (3D) mammography) the electronic noise of the detector, which may be attributable to the readout process, can become significant compared to the inherent X-ray quantum noise, thus impacting the final image quality due to the inability to distinguish small measured signals (relative to the electronic noise). Such a circumstance may be characteristic of a detector having insufficient dynamic range to accommodate the X-ray exposure levels, though in this instance the failure is in an inability to accommodate the lowest levels of radiation in view of the electronic noise that may be present.

BRIEF DESCRIPTION

In one embodiment, an imaging method is provided. In accordance with this method, an object undergoing imaging is exposed to an X-ray exposure over a time interval. Over the time interval, one or more non-destructive readout operations of a set of detector pixels are performed. Each non-destructive readout operation measures a charge at each respective pixel at the time of the readout operation and each non-destructive readout operation does not reset the overall charge at the pixel. Charge accumulation information is estimated for a subset of pixels that saturate over the time interval. An image is generated using the estimated charge accumulation information for the subset of pixels.

In a further embodiment, an imaging method is provided. In accordance with this method, an object undergoing imaging is exposed to two or more X-ray exposures. Each exposure is performed after repositioning of one or more imager components and no X-ray exposure occurs during repositioning of the one or more imager components. Between X-ray exposures, when no X-ray exposure occurs, two or more non-destructive readout operations of a set of detector pixels are performed. Each non-destructive readout operation measures a charge at each respective pixel at the time of the readout operation and each non-destructive readout operation does not reset the overall charge at the pixel. A low (electronic) noise image is generated by synthesizing the non-destructive images.

In an additional embodiment, an imaging system is provided. In accordance with this embodiment, the imaging system includes an X-ray source configured to emit X-rays and a complementary metal-oxide semiconductor (CMOS) radiation detector having a plurality of pixels configured to accumulate charge when exposed to the emitted X-rays. Each pixel is capable of non-destructive readout such that a charge is readout from each respective pixel without resetting the respective pixel. The imaging system further includes one or both of a controller or processing component configured to: command non-destructive readout of some or all of the plurality of pixels over an exposure interval to measure a charge at each read out pixel at the time of the non-destructive readout; estimate charge accumulation information for a subset of pixels that saturate over the time interval; and generate an image using the estimated charge accumulation information for the subset of pixels.

In an additional embodiment, an imaging system is provided. In accordance with this embodiment, the imaging system includes an X-ray source configured to emit X-ray, a complementary metal-oxide semiconductor (CMOS) radiation detector comprising a plurality of pixels configured to accumulate charge when exposed to the emitted X-rays.

Each pixel is capable of non-destructive readout such that a charge is readout from each respective pixel without resetting the respective pixel. The imaging system further includes a positioner configured to reposition one or both of the X-ray source or CMOS radiation detector between two or more exposure events. The X-ray source does not emit X-rays while being repositioned. The imaging system also includes one or both of a controller or processing component configured to: perform two or more non-destructive readout operations of a set of detector pixels between exposure events, wherein each non-destructive readout operation measures a charge at each respective pixel at the time of the readout operation; generate an estimate of electronic noise for each pixel of the subset of pixels using the measures of charge generated by the two or more non-destructive readout operations; and generate an image using the estimates of electronic noise.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The present approaches relate to the use of detector arrays capable of non-destructive readout operations during use. In certain embodiments, the detector is capable of non-destructive readout of the image array at a specified frame rate and also non-destructive readout of a sparse matrix of pixels at a given rate (e.g., greater than one hundred frames per second, such as several hundred (e.g., 200, 300, 400) frames per second (fps)). As discussed herein, certain nondestructive readout approaches may be utilized to extend the dynamic range of the imaging system without impacting image quality for clinically significant regions. As used herein, the dynamic range may be considered to equate to the range or ratio between the minimum and maximum signal that can be measured by the detector. As discussed herein, some portion of this dynamic range for each pixel may be lost to noise (electronic or quantum noise) typically associated with a detector readout operation.

In certain embodiments directed to addressing long exposure conditions (e.g., saturation) at the detector, non-destructive reads of the detector are performed during an exposure to estimate the X-ray exposure rate in substantially real-time. Such estimation may be performed using non-destructive sampling of a sparse image array at a frame rate sufficient to capture the X-ray exposure signal.

Conversely, in other embodiments, where short exposure conditions are an issue, the electronic noise (e.g., readout-related noise) of the detector can become significant relative to quantum noise (e.g., intrinsic noise), which can impact the final image quality. In certain such embodiments, an image may be readout non-destructively multiple times when a constant charge is present at the respective pixels (i.e., in the absence of an exposure event), and the multiple images may be processed to reduce or otherwise minimize the effects of electronic noise in the final image.

Figure 1:
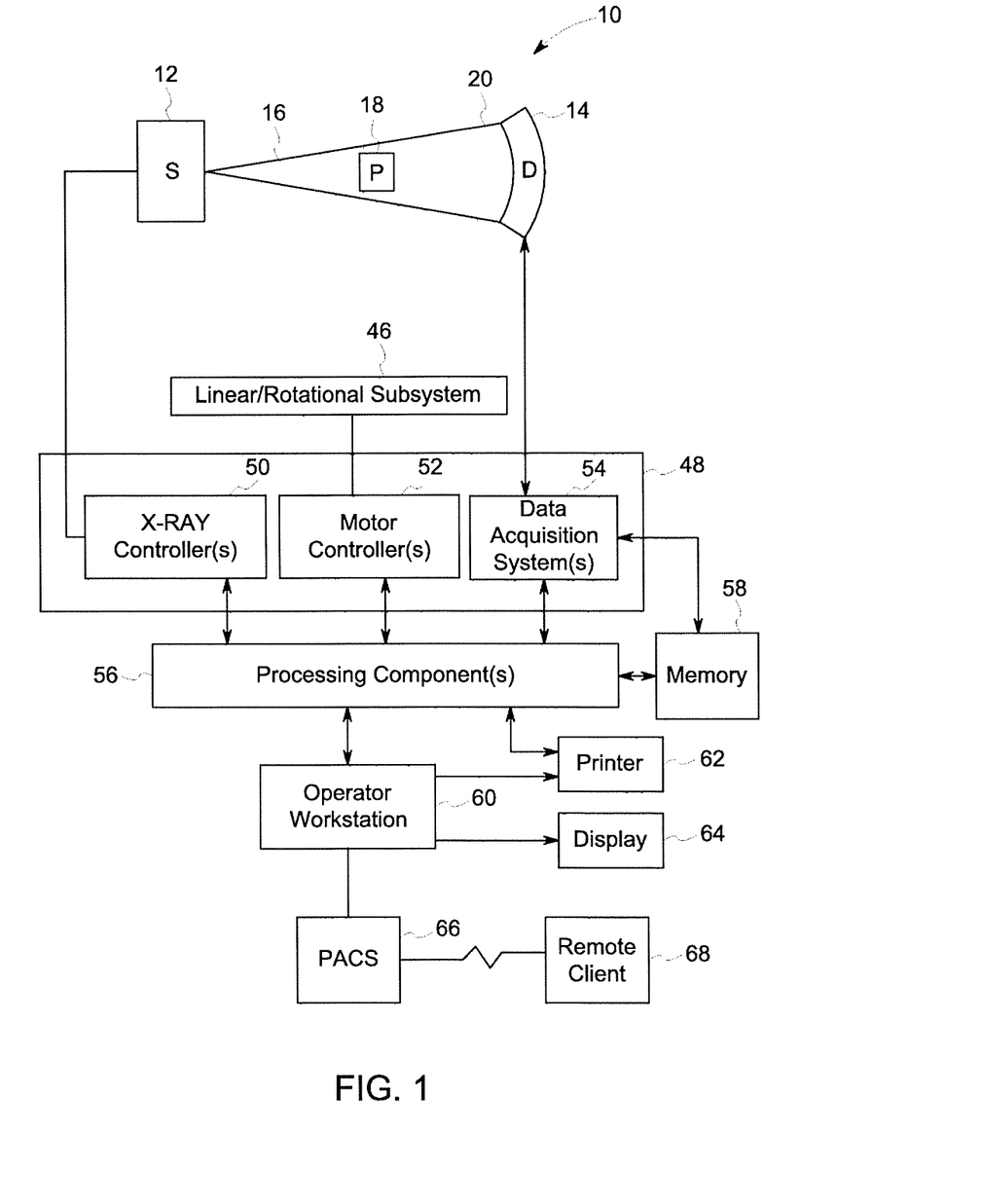
FIG. 1 is a diagrammatical view of an imaging system for use in producing images in accordance with aspects of the present disclosure.

With the preceding in mind, an example of an X-ray based imaging system 10 suitable for acquiring X-ray attenuation data for image reconstruction as discussed herein is provided in FIG. 1. In certain implementations the imaging system 10 operates so as to improve the dynamic range of the detector panel 14. For example, the detector 14 may be fabricated using complementary metal-oxide semiconductor (CMOS) materials and techniques so as to incorporate active pixels on the detector array. Such active pixels, as used herein, include amplification circuitry (e.g., an amplifier) within the respective pixel circuits themselves (as opposed to downstream and separate from the detector array) and are suitable for non-destructive readout during an imaging session. As used herein, such a non-destructive readout allows the charge at a given pixel to be inferred (i.e., read) by measuring a voltage present at the pixel at a given time. Thus, this inferred charge is determined without resetting, destroying, or otherwise losing the charge at the pixel (i.e., the pixel charge is not reset to zero). Though CMOS-based detectors are discussed in certain examples herein, it should be appreciated that the present approaches may be more generally applied to any detector capable of non-destructive readout operations, regardless of whether the fabrication of the detector utilizes CMOS components or techniques.

In the embodiment illustrated in FIG. 1, imaging system 10 includes a source of X-ray radiation 12 along with the detector 14. The X-ray source 12 may be an X-ray tube, a distributed X-ray source (such as a solid-state or thermionic X-ray source) or any other source of X-ray radiation suitable for the acquisition of medical or other images. The X-rays 16 generated by the source 12 pass into a region in which a patient 18 (or an object or other subject to be imaged), is positioned during a procedure.

In the depicted example, a portion of the X-ray radiation 20 passes through or around the patient 18 (or other subject of interest) and impacts a detector array, represented generally as the detector 14. As discussed herein, detector elements (i.e., pixels) of the detector 14 produce electrical signals that represent the intensity of the incident X-rays 20. These signals are acquired and processed, as discussed herein, to reconstruct images of the features within the patient 18 or imaged object of interest.

In accordance with present embodiments, one or both of the source 12 or detector 14 may be moved (e.g., rotated and/or linearly translated) relative to the patient or imaged object along or about one or more axes during an examination procedure during which projection data is acquired. For example, the source 12 and/or detector 14 may move about one or more axes of rotation so as to facilitate acquisition of projection data at a variety of different radial views with respect to the imaged volume. Such imager motion may be supplemented by motion of the underlying patient support (e.g., table) to achieve complex imaging trajectories with respect to the relative position and motion between the imager and patient over time. In one embodiment, the translation and rotation of the imager components may be determined or coordinated in accordance with a specified protocol.

The movement of the imager components may be initiated and/or controlled by one or more linear/rotational subsystems 46. The linear/rotational subsystems 46, as discussed in further detail below, may include support structures, motors, gears, bearings, and the like, that enable the rotational and/or translational movement of the imager components. In one embodiment, the linear/rotational subsystems 46 may include a structural apparatus (e.g., a C-arm apparatus having rotational movement about at least two axes, a gantry, and so forth) supporting the source and detector 12, 14.

Other systems and subsystems may be present to support operation of the imaging components when in use. By way of example, a suitable system 10 may includes a system controller 48 to coordinate and control the imaging components. Such a system controller may include one or more of an X-ray controller for controlling operation of source 12, a motor controller 52 for controlling motion of movable subsystems, and a data acquisition system (DAS) for handling signal readout of the detector 14. In practice, the system controller 48 may incorporate one or more processing devices that include or communicate with tangible, non-transitory, machine readable media collectively storing instructions executable by the one or more processors to perform the operations described herein.

As illustrated, the X-ray controller 50, the motor controller 52, and the data acquisition systems 54 may share one or more processing components 56 that are each specifically configured to cooperate with one or more memory devices 58 storing instructions that, when executed by the processing components 56, perform the image acquisition and reconstruction techniques described herein. Further, the processing components 56 and the memory components 58 may coordinate in order to perform the various image reconstruction processes. The system controller 48 and the various circuitry that it includes, as well as the processing and memory components 56, 58, may be accessed or otherwise controlled by an operator via an operator workstation 60. The operator workstation 60 may be communicatively coupled to a printer 62 for printing images, patient data, and the like. The operator workstation 60 may also be in communication with a display 64 that enables the operator to view various parameters in real time, to view images produced by the acquired data, and the like. The operator workstation 60 may also, in certain embodiments, be communicatively coupled to a picture archiving and communication system (PACS) 66, which may allow images to be shared with other facilities, for example, a remote client 68.

Figure 2:
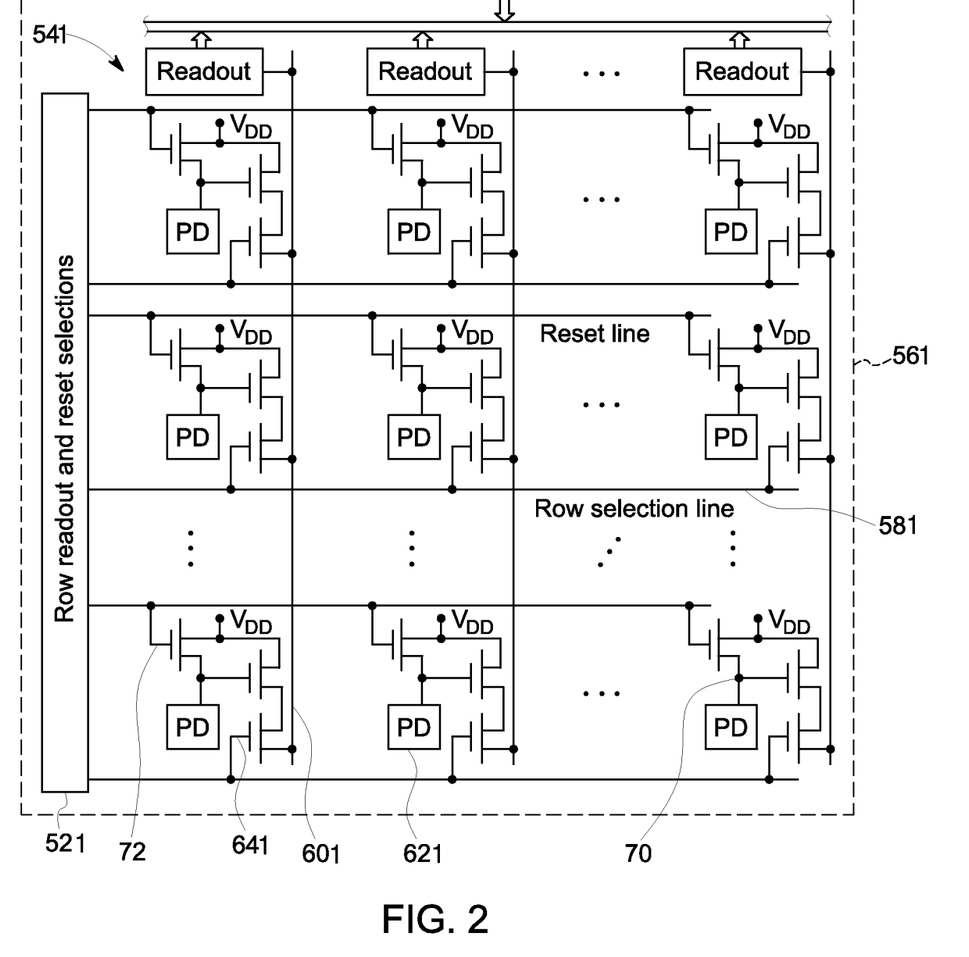
FIG. 2 depicts a schematic view of an X-ray detector suitable for use in non-destructive readout operations, in accordance with aspects of the present disclosure.

With the preceding discussion in mind, a description of one component of a detector 14 that is suitable for non-destructive readout operations is provided. Turning to FIG. 2, a schematic diagram of a CMOS light imager panel (shown by dashed lines 561) and related readout circuitry capable of non-destructive readout is depicted. In one embodiment, the pixels of FIG. 2 are active pixels, having amplification and buffering provided on the silicon substrate. In certain embodiments, such a light imager panel 561 may be provided as a component of an X-ray detector 14, such as to acquire localized charge data generated in response to a scintillator layer when the scintillator is exposed to X-ray radiation.

In certain embodiments, the CMOS imager panel 561 has an active pixel circuit arrangement that provides amplification within the individual pixel circuitry, or otherwise on the silicon substrate as opposed to in downstream connected components. Further, in the depicted example the column readout electronics 541 (connected to the column data lines 601) and the row readout selection circuitry 521 (connected to the row select scan lines 581) are fabricated on the light imager panel 561 itself, though in other embodiments certain of this circuitry may be provided off-panel.

In certain implementations the CMOS imager panel 561 is fabricated using crystalline silicon (c-Si). Because of the very high electron mobility provided within crystalline silicon (relative to amorphous silicon (a-Si)), such fabrications allow the feature size of components and circuits formed on a c-Si substrate to be smaller than what may typically formed on an a-Si substrate, thereby allowing more components (e.g., charge amplification circuitry, readout electronics, readout selection circuitry) to be formed within a pixel or on the panel 561. For example, as in the depicted embodiment, each pixel may be formed with included amplification circuitry in addition to a FET switch and the photodiode 621. Thus, a c-Si light imager panel may be employed in certain embodiments, though any light imager panel 561 and corresponding detector 14 that is capable of non-destructive readout operations may be used to perform the operations discussed herein.

With this in mind, and with respect to the respective circuit components shown in the example of FIG. 2, instead of the single gate (e.g., readout selection gate 641) each pixel may have three, four, or more gates, which may facilitate charge buffering or storage that allows non-destructive readouts to be performed. In the depicted example, the pixels shown have three gates: a charge amplifier gate 70, a row readout selection gate 641, and a charge reset gate 72. Moving the charge amplifier onto the panel 561 (e.g., inside the pixels) offers certain advantages, such as lowering electronic noise and higher EMI immunity.

Figure 3:
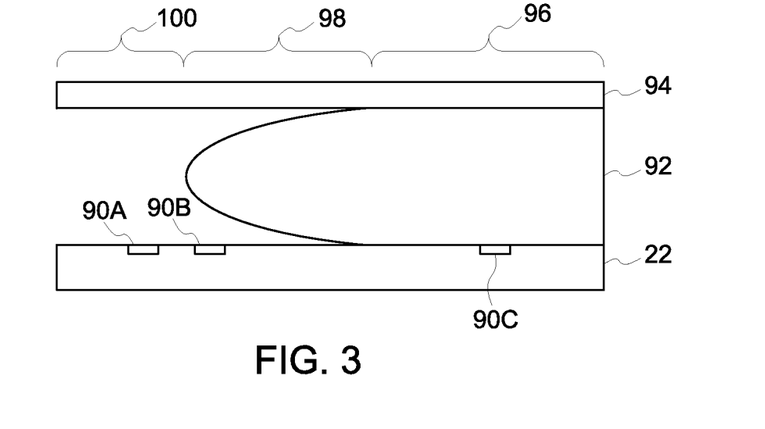
FIG. 3 is a schematic representation of a breast undergoing imaging in which X-rays are attenuated to different degrees at different points on the detector, in accordance with aspects of the present disclosure.
Figure 4:
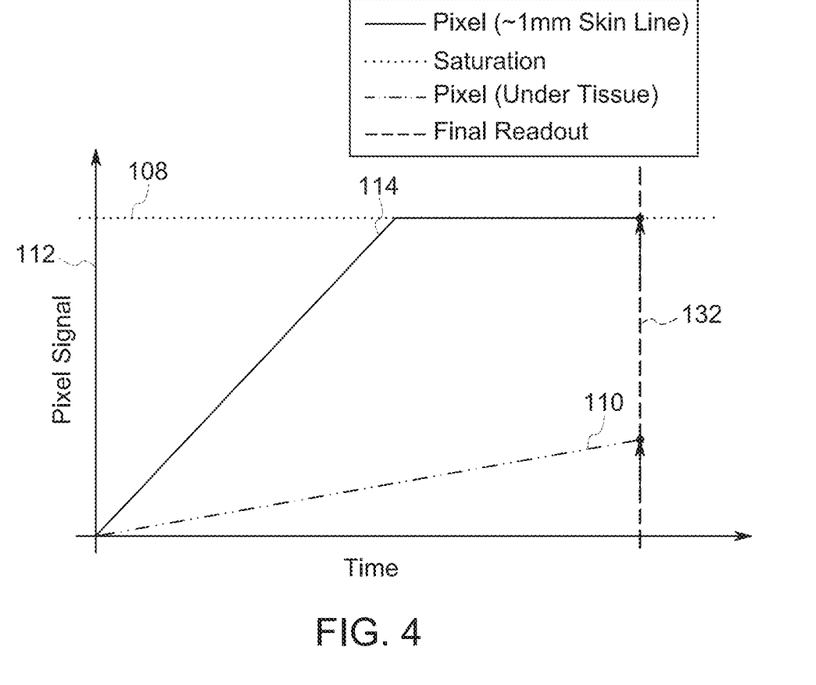
FIG. 4 graphically illustrates the charge accumulation for different pixels in a single-frame read operation.

As discussed herein, the imaging system 10, which may include a detector 14 incorporating a light imager panel 56 may be used in imaging processes that address various dynamic range issues that arise in certain imaging contexts. For example, in certain circumstances one or more pixels of the light detector panel 56 may become saturated during an exposure event. Turning to FIGS. 3 and 4 an example of such a saturation event is provided in the context of a mammography scan. In this example, a single frame acquisition (i.e., a scan in which a single read event of the light imager panel within the detector 14 is performed) is depicted.

As shown schematically in FIG. 3, a breast 92 to be imaged is compressed between a compression plate 94 and the detector 14 such that a portion 96 of the breast 92 is at a uniform thickness. A portion of 98 the breast 92, however, is compressed to a thinner, typically non-uniform, thickness due to the amount of tissue present. A third imaging region 100 is devoid of intervening breast tissue and is exposed to unattenuated X-rays during a scan.

Figure 5:
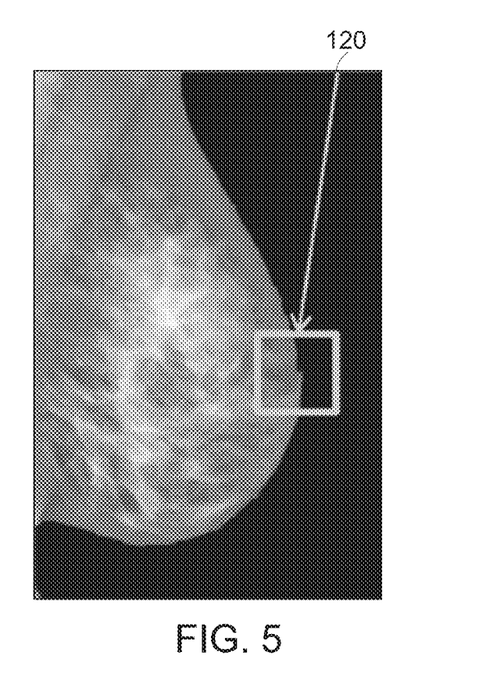
FIG. 5 is an image showing skin line artifacts present in an image generated from a single-frame acquisition.

In the depicted example three pixels 90 are shown schematically such that each pixel 90 corresponds to a respective region 96, 98, or 100 having different X-ray exposure characteristics. For example, pixel 90c, underlying the thick breast tissue region 96 receives the most attenuated X-rays and is unlikely to saturate over the exposure time (x-axis), as shown by charge accumulation line 110 and saturation threshold 108 of FIG. 4. Conversely, pixel 90a is positioned outside the boundary of the breast tissue 92 and is fully exposed to the unattenuated X-ray radiation. As a result, the pixel 90a saturates much earlier than do those pixels underneath tissue. Lastly, pixel 90b is schematically illustrated as being positioned in the vicinity of the skin line (i.e., at the tissue boundary), such that the radiation incident on the pixel 90b is partially attenuated compared to that incident on pixel 90c. That is, the X-rays incident on pixel 90b pass through some portion of tissue, and so are not unattenuated, but, as shown by charge accumulation line 114 of FIG. 4, in the scan interval associated with a single frame read (indicated as readout 132, shown by dotted), the pixel 90b becomes saturated before the scan in completed and the pixel 90b is readout. As a result, valuable information is lost at the boundary of the imaged tissue (i.e., the skin line). This limitation with respect to the dynamic range of the detector 14 (i.e., saturation at tissue regions of interest) can result in artifacts at the skin line, such as discontinuities 120 and/or other roughness at the edges of the tissue image, as seen in FIG. 5.

Figure 6:
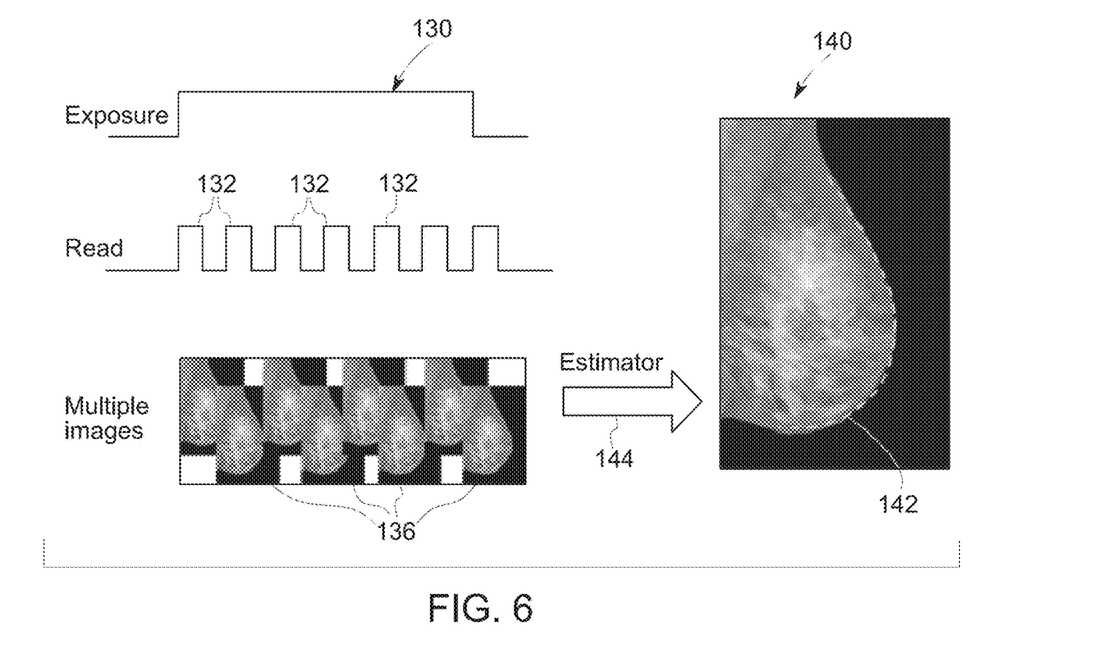
FIG. 6 depicts exposure and readout events, and corresponding images, in a multi-frame readout operation, in accordance with aspects of the present disclosure.

One approach to address saturation issues for regions where the tissue is of non-uniform thickness and where attenuation is less than what is seen for thicker tissue regions being imaged is described with reference to FIGS. 6 and 7. In this approach multiple destructive (i.e., charge depleting) readout operations are performed over the course of a single scan exposure. This is graphically illustrated in FIG. 6, where an exposure event 130 occurs over a time t. Over the course of the exposure 130, multiple destructive readout operations 132 are performed, with readout events generally timed so as to avoid saturation of pixels in those areas of the detector panel underlying tissue regions where uniform thickness cannot be achieved (e.g., near the tissue boundary within the image and so forth). Each readout operation 132 generates attenuation data that can be reconstructed into a separate image 136. Some or all of the multiple images 136 can be combined or summed to generate a final image 140 with reduced skin line artifacts. Alternatively, as shown in FIG. 6, some or all of the multiple images may be used in an estimation process 144 in which various image parameters (e.g., the skin line boundary, electronic noise, signal-to-noise, optimized pixel intensity) are estimated and used to generate a final or diagnostic image. For example, in one implementation, the skin line boundary (dotted line 142) may be estimated and the final image may include pixels populated with intensity data up to the boundary so as to minimize data loss at the boundary region.

Figure 7:
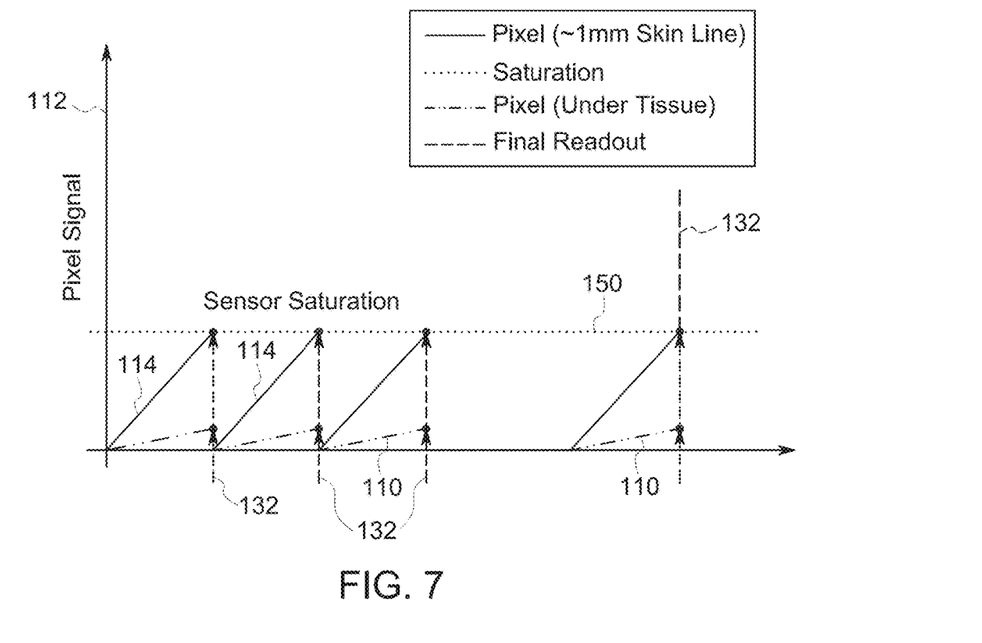
FIG. 7 graphically illustrates the charge accumulation for different pixels in a multi-frame readout operation, in accordance with aspects of the present disclosure.

Turning to FIG. 7, a graphical representation of pixel charge accumulation for such a multi-read embodiment is shown which is similar to the graphical representation of FIG. 4 and which is based on the pixel arrangement shown in FIG. 3. In this example pixel 90c, underlying the thick breast tissue region 96 receives the most attenuated X-rays and does not saturate between readout events 132, as shown by charge accumulation lines 110 and sensor saturation threshold 150. Pixel 90a is positioned outside the boundary of the breast tissue 92 and is fully exposed to the unattenuated X-ray radiation. As a result, the pixel 90a saturates much earlier than do those pixels underneath tissue, even in this multi-read scenario. Pixel 90b is schematically illustrated as being positioned in the vicinity of the skin line (i.e., at the tissue boundary), such that the radiation incident on the pixel 90b is partially attenuated compared to that incident on pixel 90c. As shown by charge accumulation lines 114 of FIG. 7, in the scan intervals associated with multiple readout events 132, the pixel 90b approaches saturation but, even if saturation is reached, does not spend substantial time in the elapsed state before being readout and the charge cleared. As a result, attenuation information is generally not lost at the boundary of the imaged tissue (i.e., the skin line) or in the regions where the tissue thickness is less than the uniformly compressed regions.

As will be appreciated, the depicted example is idealized and, in practice, the charge accumulation lines 114 may reflect that the readout events occur prior to the pixel 90b reaching saturation threshold 150 or, alternatively, some minimal amount of time may be spent in a saturated state before readout for these pixels 90b. However, due to general retention of attenuation data at the skin line, the summing or estimation processes employed to construct final image 140 from the multiple images 136 may reflect a generally expanded or extended dynamic range for the detector 14.

One issue, however, is the introduction of electronic noise with each destructive readout event. In particular, the reset of the pixel to a cleared state is generally associated with the presence of electronic noise, such that each destructive readout event has an electronic noise component. Thus, summing or combining images generated from such multiple readout operations may result in an accumulation of noise in addition to signal, which may limit the gains attainable in such a scenario. Indeed, in such a scenario, the observed signal-to-noise ratio may actually decrease, with a corresponding increase in image artifacts and/or reduction in image quality.

Figure 8:
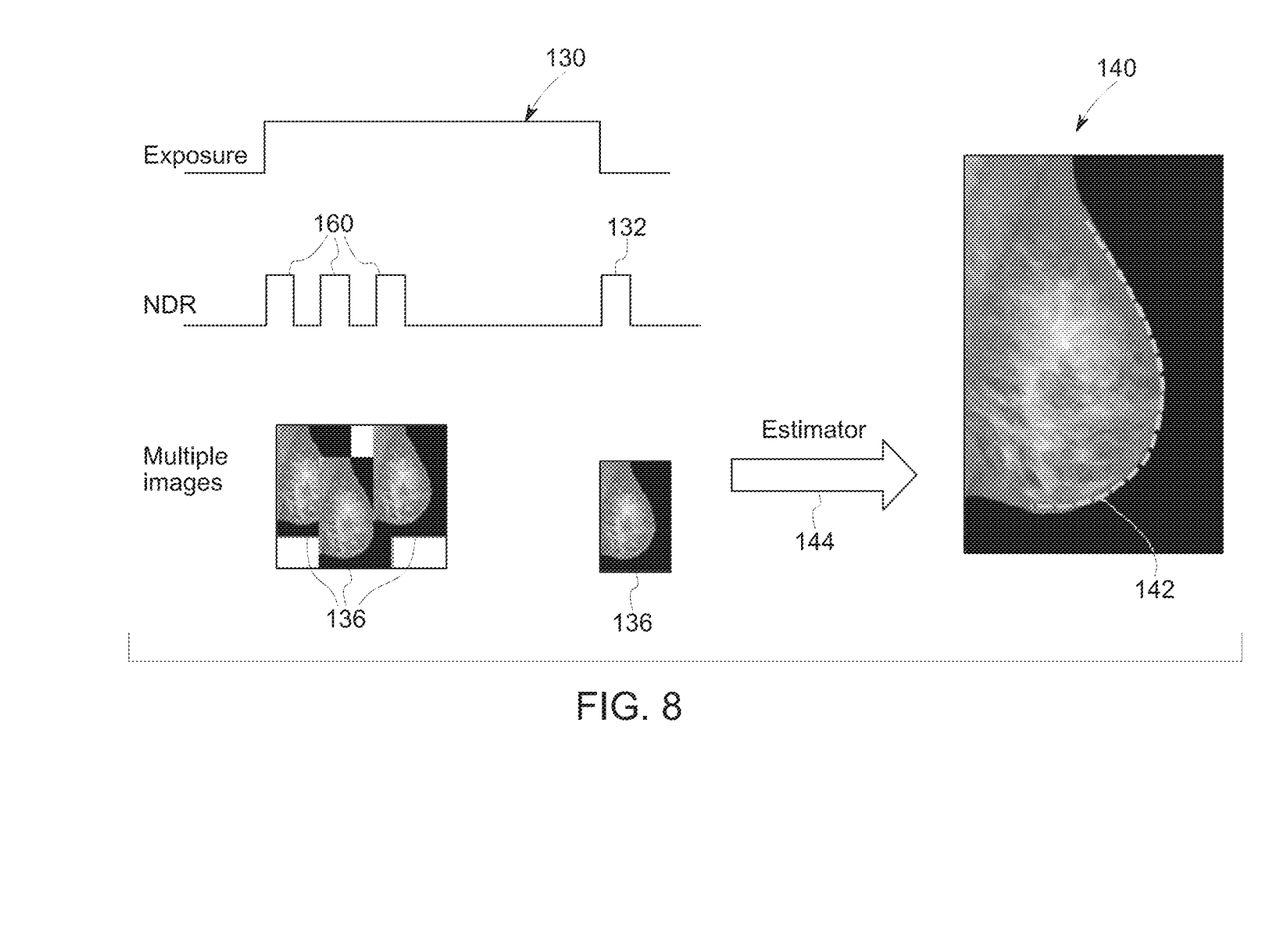
FIG. 8 depicts exposure and readout events, and corresponding images, in a multi-frame non-destructive readout operation, in accordance with aspects of the present disclosure.
Figure 9:
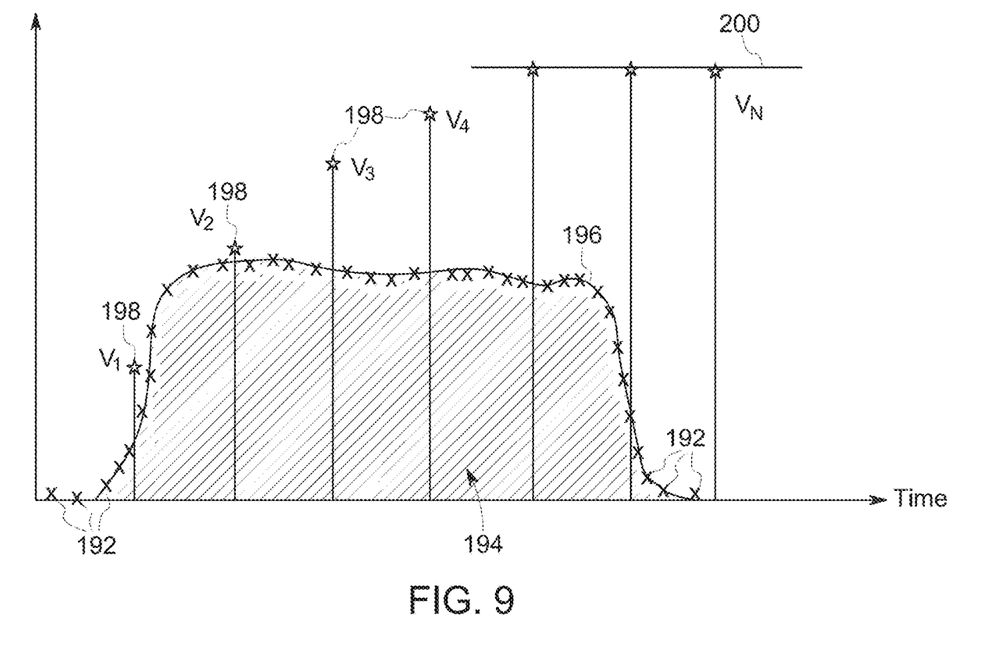
FIG. 9 illustrates charge accumulation over time in a non-destructive readout scenario, in accordance with aspects of the present disclosure.

In a second approach, discussed with respect to FIGS. 8 and 9, one or more non-destructive readout operations are employed over the course of the X-ray exposure to improve the effective dynamic range obtained using the detector 14. For example, in one embodiment X-ray exposure rate is determined in substantially real time by non-destructive sampling of a sparse image array at a frame rate sufficient to capture the X-ray exposure signal. As noted above, such non-destructive readout operations may be performed by reading out the voltage present at a pixel at a given time and inferring the stored charge based on the measured voltage. Thus, the charge is not reset in such a non-destructive readout operation.

As will be appreciated, the detector 14 in these embodiments is a detector that is suitable for or capable of performing such non-destructive readout operations and may include components, such as the light imager panel 56 of FIG. 2 that facilitate such non-destructive readout operations. Further, as the respective non-destructive readout operations maintain the acquired charge within the pixel, one can choose the sampled voltages to estimate the signal on a pixel-by-pixel basis, thereby reducing the noise associated with the imaging operation relative to those approaches employing multiple destructive readout operations. Such pixel-by-pixel implementation may be utilized so as to limit the present non-destructive readout approaches to those pixels likely to saturate, such as pixels near the skin line, and to simply use the conventional readout measure for those pixels not likely to saturate, such as those pixels under thicker regions of tissue. In this manner, unsaturated measures can be obtained for pixels under thick tissue regions as well as those near the skin line or tissue boundary.

With this in mind, and turning to FIG. 8, in certain embodiments, multiple non-destructive (i.e., charge maintaining) readout operations are performed over the course of a single scan exposure at a suitable frame rate and prior to a final destructive readout operation at the conclusion of the scan. In particular, non-destructive reads of the detector are performed during an exposure to estimate the X-ray exposure and/or exposure rate in substantially real-time (i.e., during the course of the exposure). Such estimation may be performed using non-destructive sampling of a sparse image array at a frame rate sufficient to capture the X-ray exposure signal.

This is graphically illustrated in FIG. 8, where an exposure event 130 occurs over a time t. Over the course of the exposure 130, multiple non-destructive readout operations 160 are performed in which a voltage proportional to the accumulated charge at the pixel is readout but the charge remains intact in the pixel capacitance. In such non-destructive readout operations 160, electronic noise is not introduced at the pixel level as the pixel is not reset. In the depicted example, at the end of the exposure event 130, a conventional destructive readout 132 is performed by which the accumulated charge at the pixel is readout and the pixel is reset (i.e., the accumulated charge stored in the pixel is cleared).

Each readout operation 132, 160 generates attenuation data that can be reconstructed into separate respective images 136. Due to the use of non-destructive readout operations in acquiring pixel charge data for some or all of the detector pixels used in each readout operation, a progression of charge accumulation can be discerned for those pixels imaging tissue regions that include pixels imaging the skin line or other tissue regions at less than full thickness, such that incremental charge accumulation and/or a rate of charge accumulation over the course of exposure 130 can be determined even if the pixels saturate at some point during the exposure event. This charge accumulation information may be used in the generation of the final image 140 (either by image summation or by pixel value estimation 144 using the separate images 136 to synthesize the final image 140).

A further illustration of certain of these concepts is provided with reference to FIG. 9, in which an example of pixel charge accumulation at a skin line over the course of an exposure event is illustrated. In this example, X-ray incidence at the respective pixels is shown over time by markers 192 (showing sparse non-destructive readout sampling of X-ray exposure) and shaded area 194 under curve 196 (showing X-ray exposure). In this illustration, a series of voltage samples 198 are derived at intervals using the non-destructive readout samples 192 and the voltages samples can be used to infer the accumulated charge at the pixel in response to X-ray incidence over time. Thus, the measured voltages 198 increase over time until peaking when the pixel charge becomes saturated, as shown by line 200. In this manner, a sparse set of pixels on the detector may be sampled (such as on a pixel-by-pixel basis to correspond to pixels at risk for saturation) to provide estimates of X-ray intensity over time. In one embodiment, the last inferred charge measure non-destructively sampled for a given pixel may be retained and used for image reconstruction (e.g., $V_4$ in this example). Alternatively, statistical estimates of pixel value may then be derived based on the tube-power signals for those pixels that saturate but which have clinical or diagnostic information of value.

In certain embodiments, charge accumulation information derived from the non-destructive readout operations 160 prior to saturation of the pixels imaging the less thick regions of tissue may be used to estimate various image parameters (e.g., the skin line boundary 142, electronic noise, signal-to-noise, optimized pixel intensity) used to reconstruct or synthesize a final or diagnostic image. For example, in one implementation, the skin line boundary may be estimated and the final image may include pixels populated with intensity data up to the boundary so as to minimize data loss at the boundary region.

Figure 10:
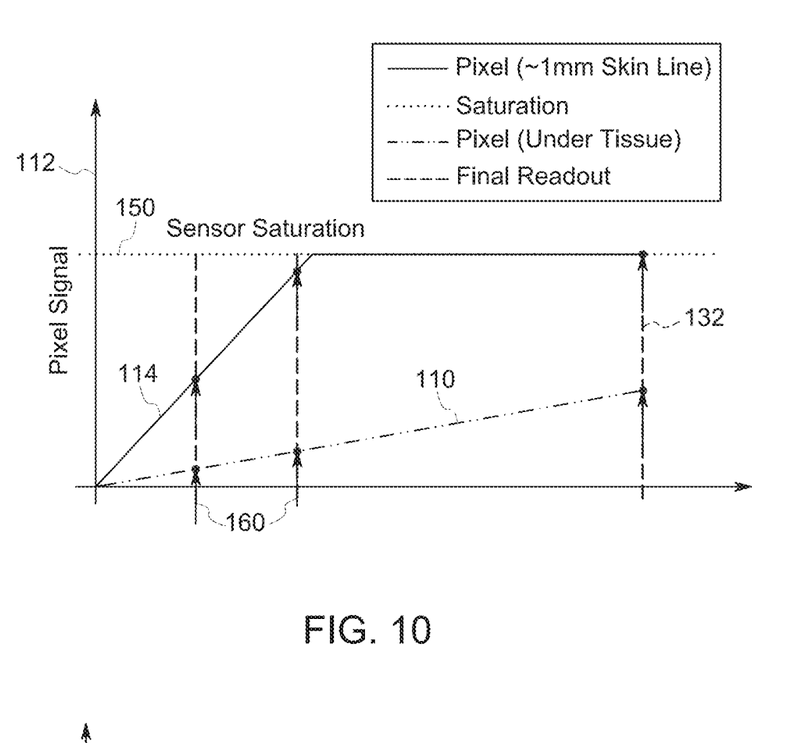
FIG. 10 graphically illustrates the charge accumulation for different pixels in a multi-frame non-destructive readout operation, in accordance with aspects of the present disclosure.

With this in mind, turning to FIG. 10, a graphical representation of pixel charge accumulation for such a non-destructive multi-read embodiment is shown which is similar to the graphical representation of FIGS. 4 and 7 and which is based on the pixel arrangement shown in FIG. 3. In this example pixel 90c, underlying the thick, uniform breast tissue region 96 receives the most attenuated X-rays and does not saturate over the course of exposure 130, as shown by charge accumulation line 110 and sensor saturation threshold 150. In the depicted example, the various non-destructive readout operations 160 and the final destructive readout operation 132 measure the charge accumulated at pixel 90c over the course of exposure 130. Pixel 90a is positioned outside the boundary of the breast tissue 92 and is fully exposed to the unattenuated X-ray radiation. As a result, the pixel 90a saturates much earlier than do those pixels underneath tissue once the scan commences.

Pixel 90b is schematically illustrated as being positioned in the vicinity of the skin line (i.e., at the tissue boundary), such that the radiation incident on the pixel 90b is partially attenuated compared to that incident on pixel 90c. As shown by charge accumulation line 114 of FIG. 10, the various non-destructive readout operations 160 measure the charge accumulating at pixel 90c over the course of exposure 130 while the final destructive readout operation 132 reads out the pixel 90b after it has been saturated. As will be appreciated, for pixels 90b attenuation information is not entirely lost at the boundary of the imaged tissue (i.e., the skin line) nor in the regions where the tissue thickness is less than the uniformly compressed regions due to some number of non-destructive reads being performed prior to saturation, thus providing useful charge accumulation information and rate of charge accumulation information. Due to acquisition of attenuation data at the skin line, the summing or estimation processes employed to construct final image 140 from the non-destructive readouts 160 and final readout 132 may reflect a generally expanded or extended dynamic range for the detector 14.

With regard to the generation of the final image 140 in the prior two examples, summation and synthesis approaches are mentioned as possible approaches for generating the final image 140 in multi-frame readout acquisitions. As noted above, in such multi-frame readout operations the pixel sample are corrupted by noise, both quantum noise intrinsic to the detector 14 and electronic noise associated with the readout and reset of the charge storing components of a pixel. In non-destructive readout approaches, the electronic noise issue may be less relevant as the electronic noise is added at some point when the pixel is finally readout and reset, i.e., the final, destructive readout, with the preceding non-destructive readout operations not contributing to the electronic noise.

As noted above, because of the noise corruption, simply summing the respective pixel values acquired in each conventional readout to generate the final image 140 may be sub-optimal as the noise present in each readout is simply summed as well. Instead in certain embodiments, a statistical estimation process (such as an estimation based on mean square error) may be employed to reduce the effects of noise in reconstructed images. In such an embodiment, a noise component may be compensated for in the acquired pixel value to more accurately correspond to the useful signal. In certain embodiments, such estimation may be provided as a hardware-based estimator (e.g., an application specific integrated circuit (ASIC) or other configured circuit, including circuits hardware circuits formed on the CMOS detector 14), a software-based estimator (e.g., one or more routines running on general or special purpose processors present on the detector 14 or on a downstream processing component), or a combination of the two.

Figure 11:
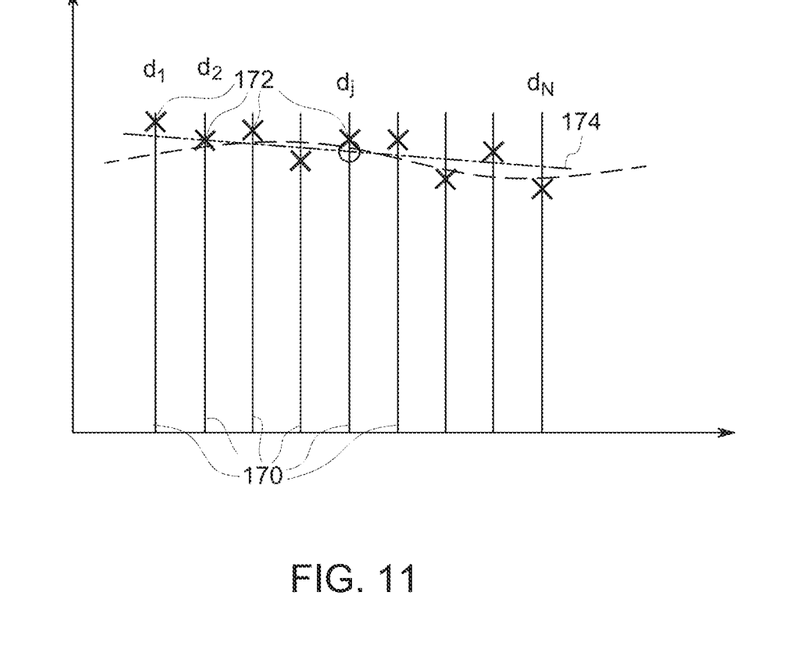
FIG. 11 graphically illustrates noise estimation in a multi-frame readout context, in accordance with aspects of the present disclosure.

By way of further explanation, FIG. 11 graphically depicts a multi-readout example, with time shown on the x-axis and charge accumulation at a pixel of interest shown on the y-axis. In this example, N readout events 170 have occurred of a respective pixel. Though the charge is constant at each event 170, the measured or inferred charge 172 may vary due to noise effects. Based on these N measurements of, a statistical approximation of the noise component (such as a mean square error estimation) may be performed to derive a measure of the statistical noise (as shown by line 174), which can then be compensated for in subsequent operations, including generation of a final or diagnostic image 140.

As discussed above, the present approaches are generally directed to improving the dynamic range of a detector by performing multiple destructive or non-destructive readout operations over the course of a single X-ray exposure. The preceding discussion primarily addresses issues related to pixel saturation, such as at thinner tissue regions near the skin line or tissue boundary, so as to acquire useful attenuation data prior to saturation or to otherwise minimize the loss of data due to saturation. Such approaches may be considered to improve dynamic range by increasing the maximum signal measurable at a given pixel. That is, addressing saturation at a given pixel improves the range or ratio of maximum to minimum usable signal at the pixel by increasing the maximum component of this range or ratio.

In other embodiments, which may or may not be used with the implementations described above, the dynamic range may be improved by addressing the minimum usable or measurable signal component of this range or ratio. In particular, noise (e.g., electronic noise) may effectively reduce the dynamic range of a pixel by effectively overwhelming small values of signal (i.e., the noise relative to the measured signal may be so high as to render the measurement of the signal component unreliable or unusable). In particular, in certain embodiments under short exposure conditions the electronic noise of the detector 14 can become significant compared to the X-ray quantum noise and thus impacting the final image quality. In accordance with certain approaches, better estimation of electronic noise may be achieved by performing multiple non-destructive readouts of the pixel(s) when no exposure event is occurring and the charge at the pixel(s) is presumably constant. The measurements at this constant charge allow the electronic noise to be estimated and removed or accounted for, allowing lower levels of measured signal to be used in an imaging context. In this manner, the amount of minimum usable signal may be improved, thereby improving the dynamic range of the pixel or detector.

Figure 12:
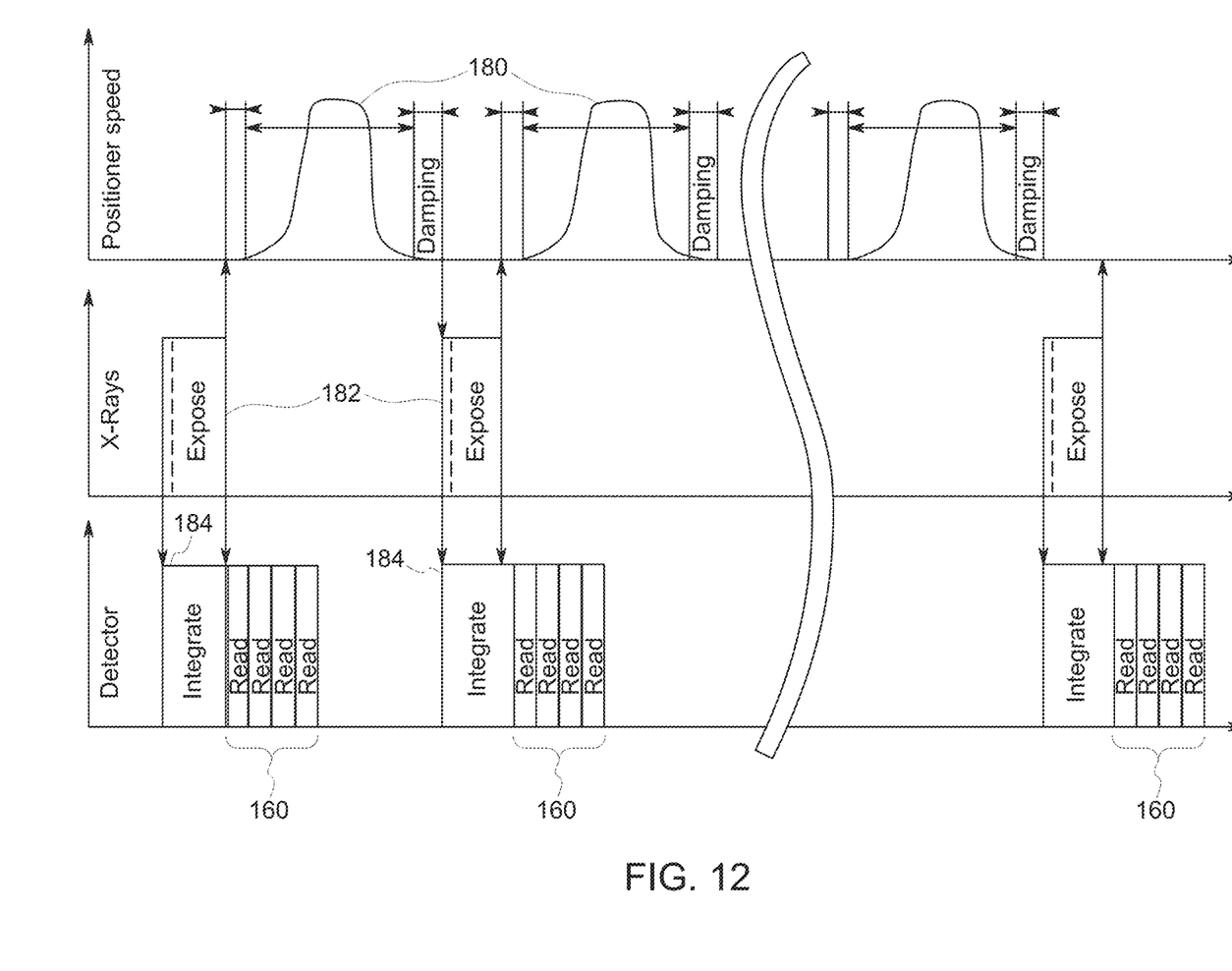
FIG. 12 illustrates the use of non-destructive readout operations during repositioning of imager components, in accordance with aspects of the present disclosure.

By way of example, and turning to FIG. 12, an approach is shown in which multiple non-destructive reads are performed during a tomosynthesis examination in which the imager components (i.e., source 12 and detector 14) are repositioned (e.g. rotated or linearly translated) between X-ray exposures, such as to obtain projection data at a from a number of different view angles (e.g., 9, 11, 15, and so forth different view angles). In this manner, three-dimensional information may be attained with a limited number of exposures.

Thus, in this example, between exposures there is an interval where the imager components are repositioned relative to the patient, such as while a C-arm or gantry rotates to the next position. In certain embodiments, a number of non-destructive readout operations 160 are performed while the imager components are repositioned but otherwise inactive. The data readout during these non-destructive reads may be used to obtain a good estimate of the signal associated with a given pixel. That is, as the same charge level is presumably being readout at each of the non-destructive readout operations 160, any variation between readouts 160 is presumably due to noise, which can then be reduced.

Turning to FIG. 12, an example of this approach is illustrated. In this example, the first row of graphs illustrates positioner speed 180 over time, the second row of graphs depict X-ray exposure events 182 over time, and the third row of graphs depict detector activity over time (i.e., primary detector readout 184 and non-destructive readouts 160 used for noise estimation). As seen in this example, during primary imaging, the positioner (e.g., C-arm or gantry) is relatively motionless while X-rays are emitted 182 and primary detector readout 184 occurs. Once an exposure 182 is completed however and any acquired charges at the detector pixels are readout and cleared, a series (here four, but any suitable number is possible) of non-destructive readout operations 160 are performed on the respective pixels of the detector 14. As no exposure event 182 is occurring at this time, the non-destructive readout operations are presumably, for a given pixel, reading out the same charge level during each operation 160. Changes between the measured charge observed at each pixel for each of the non-destructive readout operations 160 can therefore be attributed to the noise level observed at that pixel. These non-destructive readout operations, therefore, provide an estimate of the noise at each pixel. This estimated noise can then be removed from useful measured signals, thereby effectively improving dynamic range by decreasing the value of the minimum signal that can be used in a given acquisition.

Technical effects of the invention include improving dynamic range of a radiation detector by performing one or more non-destructive readout operations during a radiation exposure event. Other technical effects include performing one or more non-destructive readouts of pixels prior to saturation of the pixels during an X-ray exposure so as to obtain non-saturated measurements at the pixels. Additional technical effects include performing non-destructive readouts of pixels between exposure events so as to obtain an estimate of electronic noise during a multi-exposure examination.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An imaging method, comprising
    exposing an object to X-rays during an exposure time interval, wherein the x-rays pass through and around the object and impact a detector comprising a plurality of pixels configured to accumulate charge when exposed to X-rays;
    during the exposure time interval, at least one of a controller or a processing component sends instructions to readout circuitry to perform one or more non-destructive readout operations on a set of the plurality pixels comprising some or all of the plurality of pixels thereby producing read out pixels; wherein each non-destructive readout operation measures a charge at each read out pixel at the time of the non-destructive readout operation; and wherein each non-destructive readout operation does not reset the overall charge at the read out pixel;
    processing data from the readout operations in the processing component or in a second processing component to estimate charge accumulation information for a subset of read out pixels that saturate over the exposure time interval; and
    generating an image using the estimated charge accumulation information for the subset of pixels.

2. The imaging method of claim 1, wherein the object undergoing imaging is a tissue sample of that is not uniformly thick across an imaging area.

3. The imaging method of claim 2, wherein the tissue sample comprises compressed breast tissue.

4. The imaging method of claim 1, wherein the set of the plurality of pixels comprise amplification and charge buffering circuitry within each respective pixel.

5. The imaging method of claim 1, wherein the set of the plurality of pixels are part of a complementary metal-oxide semiconductor (CMOS) radiation detector.

6. The imaging method of claim 1, further comprising: estimating the X-ray exposure rate based on the charges measured by the one or more non-destructive readout operations.

7. The imaging method of claim 1, wherein the set of the plurality of pixels readout using the one or more non-destructive readout operations comprise a sparse image array of an overall detector.

8. The imaging method of claim 1, wherein the one or more non-destructive readout operations are performed at a frame rate greater than 100 frames per second.

9. The method of claim 1 wherein the estimation of charge accumulation information is performed during the exposure time interval.

10. The method of claim 1 wherein the image using the estimated charge accumulation information for the subset of pixels is generated by image summation or by pixel value estimation.

11. The method of claim 10 wherein the estimation of charge accumulation information is performed during the exposure time interval.

* * * * *